(12) United States Patent
Meisner et al.

(10) Patent No.: US 8,849,542 B2
(45) Date of Patent: Sep. 30, 2014

(54) REAL TIME LINEARIZATION OF A COMPONENT-LEVEL GAS TURBINE ENGINE MODEL FOR MODEL-BASED CONTROL

(75) Inventors: Richard P. Meisner, Glastonbury, CT (US); Jonnalagadda V. R. Prasad, Roswell, GA (US); Gi-Yun Chung, Atlanta, GA (US); Manuj Dhingra, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 98 days.

(21) Appl. No.: 13/538,562

(22) Filed: Jun. 29, 2012

(65) Prior Publication Data

US 2014/0005909 A1 Jan. 2, 2014

(51) Int. Cl.
*F02C 9/00* (2006.01)

(52) U.S. Cl.
CPC ............................. *F02C 9/00* (2013.01)
USPC ............... 701/100; 700/28; 700/29; 700/30; 700/31; 700/32; 703/7

(58) Field of Classification Search
USPC ........... 701/100; 700/28–32, 282, 287; 703/2, 703/6, 7, 8, 18
See application file for complete search history.

(56) References Cited

U.S. PATENT DOCUMENTS

| | | | |
|---|---|---|---|
| 5,590,718 A | 1/1997 | Bertossi | |
| 5,918,681 A | 7/1999 | Thomas | |
| 5,934,379 A | 8/1999 | Ostlyngen et al. | |
| 6,352,121 B1 | 3/2002 | Pitell et al. | |
| 6,823,253 B2 * | 11/2004 | Brunell | 701/100 |
| 7,136,770 B2 * | 11/2006 | Rivoir et al. | 702/117 |
| 7,152,023 B2 * | 12/2006 | Das | 703/2 |
| 7,198,111 B2 | 4/2007 | Dierker, Jr. et al. | |
| 7,970,482 B2 * | 6/2011 | Srinivasan et al. | 700/30 |
| 2005/0193739 A1 | 9/2005 | Brunell et al. | |
| 2006/0282177 A1 | 12/2006 | Fuller et al. | |
| 2007/0118271 A1 * | 5/2007 | Wiseman et al. | 701/100 |
| 2007/0257557 A1 | 11/2007 | Gors | |
| 2009/0012762 A1 | 1/2009 | Ellis et al. | |
| 2009/0281641 A1 * | 11/2009 | Fuller | 700/30 |
| 2010/0320021 A1 | 12/2010 | Rini et al. | |
| 2011/0052370 A1 * | 3/2011 | Karpman et al. | 700/282 |
| 2011/0054704 A1 * | 3/2011 | Karpman et al. | 700/282 |
| 2011/0077783 A1 * | 3/2011 | Karpman et al. | 700/30 |
| 2011/0230981 A1 | 9/2011 | Karpman et al. | |
| 2012/0060505 A1 | 3/2012 | Fuller et al. | |
| 2012/0310375 A1 * | 12/2012 | Liu et al. | 700/30 |
| 2013/0024179 A1 * | 1/2013 | Mazzaro et al. | 703/18 |

OTHER PUBLICATIONS

International Search Report and Written Opinion dated Sep. 23, 2013 from PCT Serial No. PCT/US2013/047598, 10 pages.

* cited by examiner

*Primary Examiner* — Helal A Algahaim
*Assistant Examiner* — Donald J Wallace
(74) *Attorney, Agent, or Firm* — Kinney & Lange, P.A.

(57) ABSTRACT

A method for model-based control of a gas turbine engine is disclosed. An operating point of the gas turbine engine is generated from measured parameters using a component-level model. The component-level model is analytically linearized by taking the first partial derivative of output parameters of each component with respect to input parameters of each component, and evaluating the result at the operating point. Components of the linearized component-level model are combined to form a combined perturbational model of the gas turbine engine, which is inverted to solve for control commands as a function of target parameters and measured parameters.

15 Claims, 3 Drawing Sheets

US 8,849,542 B2

REAL TIME LINEARIZATION OF A COMPONENT-LEVEL GAS TURBINE ENGINE MODEL FOR MODEL-BASED CONTROL

BACKGROUND

The present invention relates to model-based control of a gas turbine engine.

Modern Brayton and Ericsson cycle engines, including gas turbine engines for aircraft applications, continue to grow more complex. These engines require sophisticated control systems to handle increasing operational demands at reduced tolerances. Such engine control systems command engine actuators for control parameters such as fuel flow rate and variable engine geometries to achieve desired values of output parameters such as net thrust or engine rotor speed. A variety of control methods are currently used toward this end, including model-based control algorithms using predictive models that relate thermodynamic parameters such as flow rate, pressure, and temperature to input and output variables such as overall thrust, power output, or rotational energy.

Engine control systems are typically provided with a plurality of inputs including both current operating parameters and target parameters. Current operating parameters may include engine parameters such as rotor speeds, engine temperatures, and flow rates, as well as environmental parameters such as altitude and environmental air pressure and flow rate. Some current operating parameters are directly measured, while others may be fixed at manufacture or estimated based on measured parameters. Target parameters may include desired rotor speeds or net thrust values specified according to desired aircraft activities.

In addition to achieving specified target parameters, engine control systems are expected to avoid engine trajectories resulting in engine states that unduly reduce component lifetimes or increase likelihoods of undesired events such as engine surge, compressor stall, or engine blowout. These constraints may take the form of additional inputs provided during engine operation, maintenance, or installation. Engine control systems may be expected to achieve target parameter values while remaining within specified allowable engine trajectory ranges, or while avoiding forbidden engine trajectory ranges, or any combination of the two.

Some engine control systems rely on component-based mathematical engine models (see, e.g. U.S. Pat. No. 8,131,384). Such systems have previously used pre-calculated invertible linearizations of the component-based model at several preselected steady state conditions corresponding to possible engine operating states. During operation, the control system identifies the preselected steady state condition which most closely corresponds to current engine operating parameters. Linear coefficients of the corresponding component-based model approximation are then retrieved (e.g. from a lookup table), and used to solve for control parameters as a function of target parameters. Approximating current engine states by a set of preselected steady states is readily implemented in real time, but can give rise to inaccuracies which result in reduced control precision and diminished operating efficiency.

SUMMARY

The present invention is directed toward a system and method for model-based control of a gas turbine engine. An operating point of the gas turbine engine is generated from measured parameters using a component-level model. The component-level model is analytically linearized by taking the first partial derivative of input parameters of each component with respect to output parameters of each component, and evaluating the result at the operating point. Components of the linearized component-level model are combined to form a composite perturbational model of the gas turbine engine, which is inverted to solve for control commands as a function of target parameters and measured parameters.

DETAILED DESCRIPTION

Figure 1:
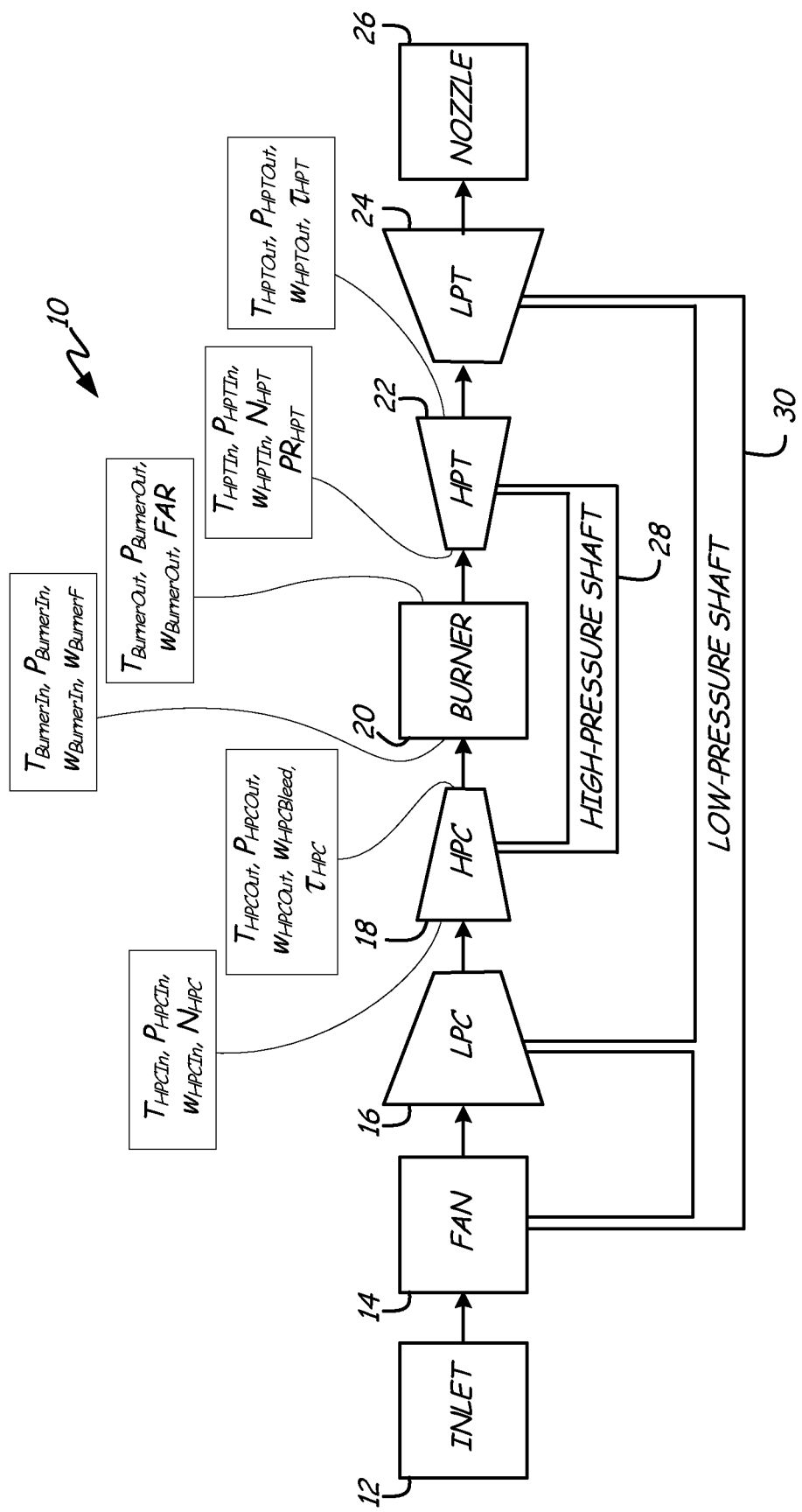
FIG. 1 is a schematic block diagram of a gas turbine engine, depicting a plurality of engine components with inputs and outputs.

FIG. 1 is a schematic block diagram of gas turbine engine 10, comprising inlet 12, fan 14, low pressure compressor (LPC) 16, high pressure compressor (HPC) 18, burner 20, high pressure turbine (HPT) 22, low pressure turbine (LPT) 24, nozzle 26, high pressure shaft (HP shaft) 28, and low pressure shaft (LP shaft) 30. FIG. 1 further indicates a plurality of engine parameters associated with HPC 18, burner 20, and HPT 22. Associated with HPC 18, FIG. 1 illustrates HPC inlet temperature $T_{HPCIn}$, HPC inlet pressure $P_{HPCIn}$, HPC inlet airflow $W_{HPCIn}$, HPC rotor speed $N_{HPC}$, HPC outlet temperature $T_{HPCOut}$, HPC outlet pressure $P_{HPCOut}$, HPC outlet airflow $W_{HPCOut}$, HPC bleed airflow $W_{HPCBleed}$, and HPC torque $\tau_{HPC}$. Associated with burner 20, FIG. 1 illustrates burner inlet temperature $T_{BurnerIn}$, burner inlet pressure $P_{BurnerIn}$, burner inlet airflow $w_{BurnerIn}$, burner inlet fuel flow $w_{BurnerF}$, burner outlet temperature $T_{BurnerOut}$, burner outlet pressure $P_{BurnerOut}$, burner outlet airflow $w_{BurnerOut}$, and fuel air ration FAR. Associated with HPT 22, FIG. 1 illustrates HPT inlet temperature $T_{HPTIn}$, HPT inlet pressure $P_{HPTIn}$, HPT inlet airflow $w_{HPTIn}$, HPT rotor speed $N_{HPT}$, HPT pressure ratio $PR_{HPT}$, HPT outlet temperature $T_{HPTOut}$, HPT outlet pressure $P_{HPTOut}$, HPT outlet airflow $w_{HPTOut}$, and HPT torque $\tau_{HPC}$. These parameters are included by way of example, only. In practice, gas turbine engine 10 may be modeled using a different set of input and output parameters for each component, potentially including larger or smaller parameter sets.

Gas turbine engine 10 is comprised of a series of functional components (inlet 12, fan 14, LPC 16, etc.), as described above. According to the present invention, each of these components is modeled with a separate component-level model (see FIGS. 2 and 3). These component-level models are combined to form a nonlinear composite model of gas turbine engine 10. Each parameter associated with each component of gas turbine engine 10 is expressed as a function of other parameters of that component in the appropriate component-level model. HPC outlet pressure $P_{HPCOut}$, for instance, can be expressed as a nonlinear analytic function of HPC inlet temperature $T_{HPCIn}$, HPC inlet pressure $P_{HPCIn}$, HPC inlet airflow $w_{HPCIn}$, and HPC rotor speed $N_{HPC}$. Most parameters in the model of each component (e.g. HPC 18) will not depend on every other parameter. The indicated parameters are intended only as examples; in practice, each component of gas turbine engine 10 may be described as a model utilizing parameters different from or in addition to the parameters indicated in FIG. 1, potentially including non-physical mapping variables as known in the art. Although FIG. 1 shows input and output parameters only for HPC 18, burner 20, and HPT 22, each component of gas turbine engine 10 can be analytically modeled as a relation between input and output parameters.

Qualitatively similar models may be used for conceptually similar components. LPC 16 and HPC 18 are both compressors, for instance, and may in some instances be described using models which differ only quantitatively (e.g. because of differences in component geometry). HPT 22 and LPT 24 are both turbines, and may similarly comprise two quantitatively distinct instances of a common conceptual level model. The number of separately modeled components which make up gas turbine engine 10 may vary depending on the physical construction of gas turbine engine 10, and on the particular models selected. Different models, for instance, may subdivide gas turbine engine 10 into a greater or lesser number of mathematical components.

Although each component of gas turbine engine 10 can be modeled separately as a function of input and output parameters, these parameters are further constrained by boundary conditions which define relationships between components. HPT 22 drives HPC 18 via high pressure shaft 28, for instance, so HPC rotor speed $N_{HPC}$ and HPT rotor speed $N_{HPT}$ must always be substantially identical. Similarly, burner outlet airflow $w_{BurnerOut}$ must equal high pressure turbine inlet airflow $w_{HPTIn}$, less any airflow losses to intermediate bleed. These boundary conditions serve to further constrain each component model, allowing the order of the composite system comprising all component models to be reduced as described in greater detail below with respect to FIG. 3.

Gas turbine engine 10 is modeled as combination of several conceptually separate components, as described above. Each component-level model defines a relationship between input and output variables for the corresponding component. These relationships are typically nonlinear and frequently complex, but can be analytically solved to determine output parameters as a function of input parameters. For purposes of engine control, it is desired to determine the input parameters required to generate desired output parameters. This requires inversion of the model such that input variables are calculated as a function of desired and known output variables, thereby determining how adjustable engine parameters must be actuated to achieve desired results. Because the complex nonlinear models described above are not conducive to inversion, a gas turbine engine control system is described below with respect to FIGS. 2 and 3 wherein the component-level composite model is used to generate a linear approximation model about a current actual operating point of gas turbine engine 10. This linear model is inverted to solve for input parameters which achieve desired engine output parameters.

Figure 2:
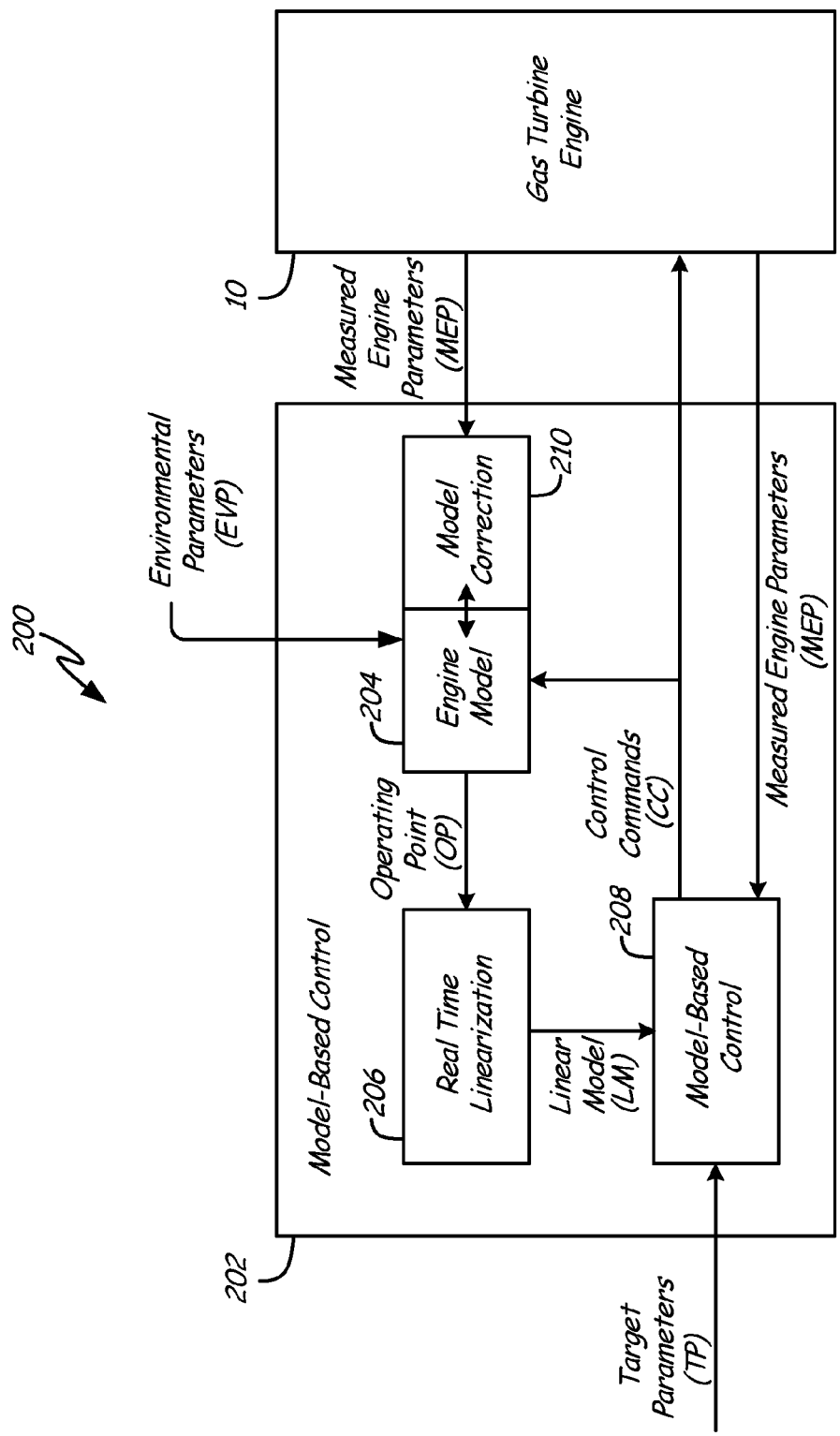
FIG. 2 is a system logic diagram of a component-based control system for the gas turbine of FIG. 1.

FIG. 2 depicts engine system 200 comprising gas turbine engine 10 and model-based control system 202. Model-based control system 202 includes engine model block 204, real time linearization block 206, model-based control block 208, and model correction block 210. Model-based control system 202 is a control system which commands actuators of gas turbine engine 10 based on externally supplied target parameters TP, measured engine parameters MEP, and environmental parameters EVP. Model-based control system 202 also utilizes calibration parameters (not shown) which are set at manufacture or during maintenance, and which do not vary substantially during engine operation. Model-based control system 202 may, for instance, be a control system executed on a full authority digital engine control (FADEC) device or similar logic-capable computer hardware attached to sensors and actuators of gas turbine engine 10.

Model-based control system 202 is comprised of four logic blocks: engine model block 204, real time linearization block 206, model-based control block 208, and model correction block 210. These logic blocks represent distinct processes performed by model-based control system 202, but may share common hardware. In particular, engine model block 204, real time linearization block 206, model-based control block 208, and model correction block 210 may be software algorithms running on a shared processor of a FADEC device or similar digital computer. Model-based control system 202 outputs control commands CC for actuators of gas turbine engine 10. Control commands CC may include commands for a variety of engine effectors, including fuel flow regulation commands, compressor variable geometry, variable compressor bleed, and variable nozzle area.

The logic flow paths indicated in FIG. 2 reflect one time step in a control process using model-based control system 202. Engine model block 204 provides operating point OP, a vector of engine parameters describing a current state of gas turbine engine 10, to real time linearization block 206 as described in greater detail below. Real time linearization block 206 produces a linear model LM, a first order Taylor series approximation of engine model 204 evaluated at operating point OP. In one embodiment, linear model LM is a matrix that relates input parameters (such as measured engine parameter MEP and environmental parameter EVP) to control commands CC for gas turbine engine 10. Model-based control block 208 inverts linear model LM and applies target parameters TP and measured engine parameters MEP from gas turbine engine 10 to the inverted model to calculate control parameters CC which are issued to gas turbine engine 10 and engine model block 204. Target parameters TP may, for instance, include command inputs from pilots or airframe systems such as power lever angle, desired thrust, or rotor speeds. Estimates of measured engine parameters MEP from the engine model block 204 are compared with actual measured engine parameters MEP in the model correction block 210. Model correction block 210 then updates engine model block 204 for the next timestep, correcting for gradual drift due and deterioration of gas turbine engine 10. With the aid of model correction block 210, the ending model of engine model block 204 converges on actual engine behavior in e.g. order ~10 seconds; sufficiently quickly to ensure that the model remains a good predictor of actual engine values, but sufficiently slowly to avoid tracking noise in measured parameters MEP and environmental parameter EVP, as well as high frequency errors in the engine model.

Engine model block 204 contains a nonlinear component-level analytic model of gas turbine engine 10, as introduced above with respect to FIG. 1. Engine model block 204 provides operating point OP to real time linearization block 206. Operating point OP is a collection of parameter values (e.g. HPC bleed airflow $w_{HPCBleed}$, HPT torque $\tau_{HPC}$, HPT outlet airflow $w_{HPTOut}$; see FIG. 1) describing a current state of each component of gas turbine engine 10. Operating point OP comprises both measured values and non-measured parameter values. Non-measured parameters contained in operating point OP are provided by engine model 204, which calculates these non-measured parameter values analytically based on measured values. Measured parameters, including both measured engine parameters MEP and environmental parameter EVP, are collected by sensors situated in and near gas turbine engine 10.

Real time linearization block 206 uses operating point OP to generate an approximation of the nonlinear component-level models of engine model block 204, evaluated at operating point OP (e.g. a first order Taylor series approximation or computational equivalent thereof). More particularly, real time linearization block 206 analytically linearizes each component-level model, combines component level models, and reduces the order of the resulting combined matrix by matching boundary conditions as described in greater detail below with respect to FIG. 3, thereby producing linear model LM. Linear model LM takes the form of a constant coefficient matrix relating engine state, measured engine parameters MEP, and control parameters.

Model-based control block 208 inverts linear model LM and generates control commands CC as a function of target parameters TP and measured engine parameters MEP. Control commands CC are actuator signals reflecting adjustable parameters of gas turbine engine 10 which will produce target parameters TP from the current engine state, as described by operating point OP. Model-based control block 208 transmits control commands CC to actuators situated within gas turbine engine 10. Model-based control block 208 also transmits control commands CC, or similar signals reflecting the aforementioned control parameters, to engine model block 204 which uses these signals to estimate expected values for measured engine parameters MEP. These are then used in conjunction with actual measured engine parameters MEP by model correction block 210 for iterative improvement of engine model 204 for the next time step.

Figure 3:
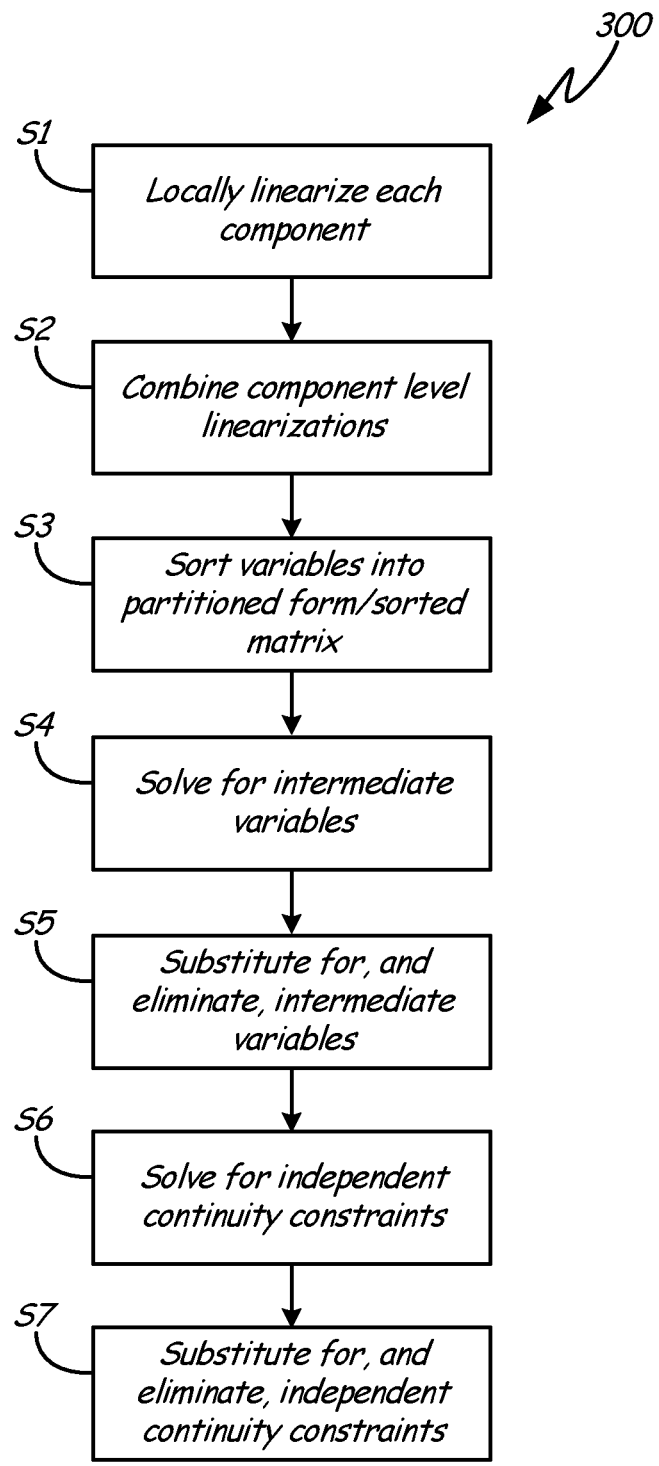
FIG. 3 is a flow chart illustrating a real-time linearization method utilized by the control system of FIG. 2.

FIG. 3 is a flow chart of steps S1 through S7 of method 300, by which real time linearization block 206 produces linear model LM from operating point OP and a non-linear component-level model.

At step S1, real time linearization block 206 locally linearizes each component by calculating first partial derivatives of output parameters (e.g. HPC outlet temperature $T_{HPCOut}$, HPC outlet pressure $P_{HPCOut}$, HPC outlet airflow $w_{HPCOut}$, HPC bleed airflow $w_{HPCBleed}$, HPC torque $\tau_{HPC}$) with respect to input parameters (e.g. HPC inlet temperature $T_{HPCIn}$, HPC inlet pressure $P_{HPCIn}$, HPC inlet airflow $w_{HPCIn}$, HPC rotor speed $N_{HPC}$) of that component (step S1). For each component X, $OUT_X = M_X INP_X$, where $INP_X$ and $OUT_X$ are vectors expressing changes over a single time step in inputs and outputs, respectively, of component X, and $M_X$ is a matrix of first partial derivatives of component output parameters with respect to component input parameters. In absolute terms, [output parameters at next timestep]≈[output parameters at previous timestep]+$OUT_X$. For HPC 18, for example, $OUT_{HPC}$=HPC $INP_{HPC}$, i.e.:

$$\begin{pmatrix} T_{HPCOut} \\ P_{HPCOut} \\ w_{HPCOut} \\ w_{HPCBleed} \\ \tau_{HPC} \end{pmatrix} = \quad \text{[Equation 1]}$$

$$\begin{bmatrix} \frac{\partial T_{HPCOut}}{\partial T_{HPCIn}} & \frac{\partial T_{HPCOut}}{\partial P_{HPCIn}} & \frac{\partial T_{HPCOut}}{\partial w_{HPCIn}} & \frac{\partial T_{HPCOut}}{\partial N_{HPC}} \\ \frac{\partial P_{HPCOut}}{\partial T_{HPCIn}} & \frac{\partial P_{HPCOut}}{\partial P_{HPCIn}} & \frac{\partial P_{HPCOut}}{\partial w_{HPCIn}} & \frac{\partial P_{HPCOut}}{\partial N_{HPC}} \\ \frac{\partial w_{HPCOut}}{\partial T_{HPCIn}} & \frac{\partial w_{HPCOut}}{\partial P_{HPCIn}} & \frac{\partial w_{HPCOut}}{\partial w_{HPCIn}} & \frac{\partial w_{HPCOut}}{\partial N_{HPC}} \\ \frac{\partial w_{HPCBleed}}{\partial T_{HPCIn}} & \frac{\partial w_{HPCBleed}}{\partial P_{HPCIn}} & \frac{\partial w_{HPCBleed}}{\partial w_{HPCIn}} & \frac{\partial w_{HPCBleed}}{\partial N_{HPC}} \\ \frac{\partial \tau_{HPC}}{\partial T_{HPCIn}} & \frac{\partial \tau_{HPC}}{\partial P_{HPCIn}} & \frac{\partial \tau_{HPC}}{\partial w_{HPCIn}} & \frac{\partial \tau_{HPC}}{\partial N_{HPC}} \end{bmatrix}$$

$$\begin{pmatrix} T_{HPCIn} \\ P_{HPCIn} \\ w_{HPCIn} \\ N_{HPC} \end{pmatrix}$$

In this example, $OUT_{HPC}$ represents a vector of perturbations in output parameters of HPC 18. In step S1, real time linearization block 206 computes matrices $M_X$ for each component of gas turbine engine 10 (HPC, Burner, LPC, . . . , etc.).

At step S2, real time linearization block 206 creates a composite linear model L by combining all component-level input/output linearizations produced in step S1 with continuity constraints $c_x$ reflecting error terms E formed by linear combinations of input and output parameters related between component models, i.e.:

$$\begin{bmatrix} OUT_{LPC} \\ OUT_{HPC} \\ OUT_{Burner} \\ \ldots \\ E \end{bmatrix} = \overbrace{\begin{bmatrix} LPC & 0 & 0 & 0 \\ 0 & HPC & 0 & 0 \\ 0 & 0 & Burner & 0 \\ 0 & 0 & 0 & \ldots \\ c_a & c_b & c_c & c_d \end{bmatrix}}^{L} \begin{bmatrix} INP_{LPC} \\ INP_{HPC} \\ INP_{Burner} \\ \ldots \end{bmatrix} \quad \text{[Equation 2]}$$

where $OUT_{LPC}$, $OUT_{HPC}$, and $OUT_{Burner}$ are vectors of LPC, HPC, and Burner outputs, respectively, $INP_{LPC}$, $INP_{HPC}$, and $INP_{Burner}$ are vectors of LPC, HPC, and Burner outputs, respectively, and E is a submatrix of dependent variables in the non-linear model reflecting error with respect to continuity constraints $e_X$ (e.g. $e_{NHPShaft}=N_{HPC}-N_{HPT}$, $e_{wConservation1}=w_{BurnerOut}-w_{HPTIn}$).

At step S3, real time linearization block 206 sorts variables composite linear model L by type into a partitioned form/sorted matrix. Intermediate variables which are outputs of one component model and inputs of another are sorted into vector F. In some instances F may be further sorted following gas flow direction in gas turbine engine 10. Independent (i.e. input) variables which are adjusted to satisfy continuity constraints, such as compressor flow, are sorted into vector Z. Engine states such as rotor speeds and metal temperatures are sorted into submatrix X, while time derivatives of these quantities are sorted into submatrix Xd. External inputs to the non-linear model, including parameters such as fuel flow and configurable engine geometries that are configurable via control commands CC, are sorted into submatrix U. External outputs of the non-linear model, including net thrust and other quantities specified according to target parameters TP, are sorted into submatrix Y. Accordingly:

$$\begin{bmatrix} F \\ E \\ Xd \\ Y \end{bmatrix} = \begin{bmatrix} L_{F,F} & L_{F,Z} & L_{F,X} & L_{F,U} \\ L_{E,F} & L_{E,Z} & L_{E,X} & L_{E,U} \\ L_{Xd,F} & L_{Xd,Z} & L_{Xd,X} & L_{Xd,U} \\ L_{Y,F} & L_{Y,Z} & L_{Y,X} & L_{Y,U} \end{bmatrix} \begin{bmatrix} F \\ Z \\ X \\ U \end{bmatrix} \quad \text{[Equation 3]}$$

where, e.g. $L_{F,Z} = \frac{\partial F}{\partial Z}$

At step S4, real time linearization block 206 next solves for F as follows:

$$F = L_{F,F}F + L_{F,Z}Z + L_{F,X}X + L_{F,U}U$$

$$(I - L_{F,F})F = L_{F,Z}Z + L_{F,X}X + L_{F,U}U$$

$$F = (I - L_{F,F})^{-1}L_{F,Z}Z + (I - L_{F,F})^{-1}L_{F,X}X + (I - L_{F,F})^{-1}L_{F,U}U \quad (4)$$

thereby allowing the following substitution to eliminate intermediate variables F (step S5):

$$\begin{bmatrix} E \\ Xd \\ Y \end{bmatrix} = \overbrace{\begin{bmatrix} K_{E,Z} & K_{E,X} & K_{E,U} \\ K_{Xd,Z} & K_{Xd,X} & K_{Xd,U} \\ K_{Y,Z} & K_{Y,X} & K_{Y,U} \end{bmatrix}}^{K} \begin{bmatrix} Z \\ X \\ U \end{bmatrix} \quad \text{[Equation 5]}$$

Where K is defined as follows:

$K_{E,Z} = L_{E,Z} + L_{E,F}(I - L_{F,F})^{-1} L_{F,Z}$, $K_{Xd,Z} = L_{Xd,Z} + L_{Xd,F}(I - L_{F,F})^{-1} L_{F,Z}$, $K_{Y,Z} = L_{Y,Z} + L_{Y,F}(I - L_{F,F})^{-1} L_{F,Z}$, $K_{E,X} = L_{E,X} + L_{E,F}(I - L_{F,F})^{-1} L_{F,X}$, $K_{Xd,X} = L_{Xd,X} + L_{Xd,F}(I - L_{F,F})^{-1} L_{F,X}$, $K_{Y,X} = L_{Y,X} + L_{Y,F}(I - L_{F,F})^{-1} L_{F,X}$, $K_{E,U} = L_{E,U} + L_{E,F}(I - L_{F,F})^{-1} L_{F,U}$, $K_{Xd,U} = L_{Xd,U} + L_{Xd,F}(I - L_{F,F})^{-1} L_{F,U}$, and $K_{Y,U} = L_{Y,U} + L_{Y,F}(I - L_{F,F})^{-1} L_{F,U}$ This substitution and elimination results in K of lower order than L. This reduction in order reflects the expression of intermediate variables in terms of inputs and outputs.

At step S6, real time linearization block 206 solves for continuity constraint variables Z such that all continuity constraint errors are zero (e.g. $e_{NHPShaft} = N_{HPC} - N_{HPT} = 0$, $e_{wConservation1} = W_{BurnerOut} - W_{HPTIn} = 0$), thereby forcing boundary conditions between individual components of gas turbine engine 10 to match. Accordingly:

$E = K_{E,Z}Z + K_{E,X}X + K_{E,U}U = 0$ $K_{E,Z}Z = -(K_{E,X}X + K_{E,U}U)$ $Z = -K_{E,Z}^{-1}(K_{E,X}X + K_{E,U}U)$ (6)

thereby allowing the following substitution to eliminate intermediate independent continuity constraints Z (step S7), producing:

$$\begin{bmatrix} Xd \\ Y \end{bmatrix} = \begin{bmatrix} K_{Xd,X} - K_{Xd,Z}K_{E,Z}^{-1}K_{E,X} & K_{Xd,U} - K_{Xd,Z}K_{E,Z}^{-1}K_{E,U} \\ K_{Y,X} - K_{Y,Z}K_{E,Z}^{-1}K_{E,X} & K_{Y,U} - K_{Y,Z}K_{E,Z}^{-1}K_{E,U} \end{bmatrix} \begin{bmatrix} X \\ U \end{bmatrix} \quad \text{[Equation 7]}$$

$$\text{or} \quad \begin{bmatrix} Xd \\ Y \end{bmatrix} = \overbrace{\begin{bmatrix} A & B \\ C & D \end{bmatrix}}^{LM} \begin{bmatrix} X \\ U \end{bmatrix} \quad \text{[Equation 8]}$$

where LM is a linear model expressing external outputs Y specified by target parameters TP as a function of external inputs U configurable via control commands CC and states X and Xd supplied by gas turbine engine 10 as measured engine parameters MEP (and, in some instances, environmental parameters EVP).

Real time linearization block 206 uses method 300 to produce linear model LM, a matrix which relates external inputs to external outputs as a function of measured parameters and rates of changes of measured parameters in gas turbine engine 10. Linear model LM can thus be inverted to solve for inputs as a function of desired outputs:

$$\begin{bmatrix} X \\ U \end{bmatrix} = LM^{-1} \begin{bmatrix} Xd \\ Y \end{bmatrix} \quad \text{[Equation 9]}$$

thereby allowing model-based control block 208 to compute appropriate control commands CC corresponding to external inputs U so as to achieve target parameters TP corresponding to external outputs Y. Model-based control 202 thus uses the nonlinear relationships of an analytic component-level engine model, in conjunction with a current estimated engine operating point OP, to derive a linear model LM, a perturbational response model about the current operating point. Because linear model LM is produced from an engine model analytically linearized on a component level using current operating point OP, it provides a more accurate model of gas turbine engine 10 at each time step than a linear model selected from a finite subset of pre-calculated linear models calculated offline at steady state conditions. This increased model accuracy allows model-based control system 202 to achieve target parameters TP more precisely, while more reliably avoiding unfavorable engine trajectories by narrower margins. Model-based control system 202, and more particularly real time linearization block 206, therefore enable gas turbine engine 10 to more efficiently achieve desired operating states and avoid undesirable operating states.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for model-based control of a gas turbine engine, the method comprising:
   generating an operating point of the gas turbine engine from measured parameters using a component-level model comprised of a plurality of components;
   analytically linearizing the component-level model by taking the first partial derivative of input parameters of each component with respect to output parameters of each component, and evaluating the result at the operating point;
   combining components of the linearized component-level model to form a combined perturbational model of the gas turbine engine;
   reducing an order of the combined perturbational model by eliminating internal variables;
   inverting the combined perturbational model to solve for control commands as a function of target parameters and the measured parameters;
   applying the target parameters and the measured parameters to the combined perturbational model to generate control commands; and
   controlling, by a processor an actuator of the gas turbine engine according to the control commands.

2. The method of claim 1, further comprising reducing the order of combined perturbational model by eliminating error terms corresponding to discontinuities between parameters of adjacent components of the gas turbine engine.

3. The method of claim 1, wherein the operating point is partially constructed of measured parameters, and partially constructed of non-measured parameters calculated using the component-level model.

4. The method of claim 1, wherein the component-level model includes at least one compressor component matrix, at least one burner component matrix, and at least one turbine component matrix.

5. The method of claim 1, further comprising iteratively updating the component-level model using the measured parameters and the control commands.

6. A method for model-based control of a gas turbine engine comprising a plurality of connected components, the method comprising:
- collecting a plurality of measured parameters from sensors situated on and near the gas turbine engine;
- calculating an engine operating point based on the measured parameters, using a nonlinear component-level analytic engine model;
- generating a first order perturbational approximation of the non-linear component-level analytic engine model for each of the plurality of connected components;
- combining the first-order perturbational approximations for each of the plurality of connected components into a first combined model;
- reducing an order of the first combined model to produce a reduced-order linear model;
- inverting the reduced-order linear model to form a matrix expression of external engine inputs in terms of external engine outputs;
- computing control commands for an actuator of the gas turbine engine from target parameters, the measured parameters, and the inverted third linear model; and
- controlling, by a processor the actuator according to the computed control commands.

7. The method of claim 6, wherein reducing the order of the first combined model to produce a reduced-order linear model comprises eliminating intermediate parameters of the first combined model.

8. The method of claim 6, wherein reducing the order of the first combined model to produce a reduced-order linear model comprises eliminating boundary errors of the second combined model.

9. The method of claim 6, wherein the first combined model further comprises matrix terms reflecting agreement between boundary conditions of adjacent components from among the plurality of connected components.

10. The method of claim 6, wherein the engine operating point is calculated based on environmental parameters and measured engine parameters.

11. The method of claim 6, wherein the engine nonlinear component-level analytic engine model is iteratively improved by comparing the measured parameters with the control commands.

12. A gas turbine engine system comprising:
- a gas turbine engine with a plurality of distinct but connected components and a plurality of actuators; and
- a model-based control system which issues, by a processor control commands to the plurality of actuators based on measured parameters, target parameters, and a linear model of each connected component, the model-based control system comprising:
  - an engine model block configured to determine an engine operating point from the measured parameters and a non-linear model;
  - a real time linearization block configured to produce a linear model by analytically linearizing the non-linear model on a component level and matching boundary conditions between connected components of the gas turbine engine, wherein producing the linear model comprises:
    - forming a component matrix of first partial derivatives of inputs with respect to outputs evaluated at the engine operating point for each of the plurality of distinct but connected components;
    - assembling a combined matrix from component matrices for each of the plurality of distinct but connected components and from boundary conditions between the plurality of distinct but connected components; and
    - reducing an order of the combined matrix to produce the linear model; and
  - a model-based control block configured to produce the control commands from the target parameters and the measured parameters using an inversion of the linear model.

13. The gas turbine engine system of claim 12, wherein the linear model is a matrix representation of output parameters and a first subset of the measured parameters in terms of input parameters and a second subset of the input parameters.

14. The gas turbine engine system of claim 12, wherein the engine operating point is a collection of the measured parameters and non-measured parameters determined from the measured parameters and a non-linear model.

15. The gas turbine engine system of claim 12, wherein the engine model block is iteratively corrected using the control commands and the measured parameters.

* * * * *